US008465278B2

(12) United States Patent
Bittner et al.

(10) Patent No.: US 8,465,278 B2
(45) Date of Patent: Jun. 18, 2013

(54) APPARATUS AND METHOD FOR HEAT RECOVERY FROM ROTARY KILNS

(75) Inventors: Jeffrey J. Bittner, Clawson, MI (US); Hugh E. Crosmun, Southgate, MI (US)

(73) Assignee: Carmeuse Lime, Inc., Pittsburgh, PA (US)

( * ) Notice: Subject to any disclaimer, the term of this patent is extended or adjusted under 35 U.S.C. 154(b) by 890 days.

(21) Appl. No.: 12/615,348

(22) Filed: Nov. 10, 2009

(65) Prior Publication Data
US 2011/0108248 A1 May 12, 2011

(51) Int. Cl.
*F27B 7/10* (2006.01)

(52) U.S. Cl.
USPC ............ 432/107; 432/109; 432/113; 432/115

(58) Field of Classification Search
USPC ................. 432/103, 107, 109, 112, 113, 115, 432/116; 122/7 R
See application file for complete search history.

(56) References Cited

U.S. PATENT DOCUMENTS

| | | | |
|---|---|---|---|
| 3,097,833 A * | 7/1963 | Harris et al. ................... | 432/106 |
| 3,171,639 A | 3/1965 | McGregor et al. ............. | 263/34 |
| 3,876,367 A | 4/1975 | Vorobeichikov et al. ...... | 432/116 |
| 3,986,819 A | 10/1976 | Heian .............................. | 432/14 |
| 4,014,106 A * | 3/1977 | Bearce ............................ | 34/142 |
| 4,125,437 A * | 11/1978 | Bacon ............................ | 202/117 |
| 4,191,530 A * | 3/1980 | Bearce ........................... | 432/107 |
| 4,238,187 A | 12/1980 | Euskirchen .................... | 432/116 |
| 4,836,775 A * | 6/1989 | Heithoff et al. ................ | 432/112 |
| 5,230,617 A | 7/1993 | Klein et al. .................... | 432/233 |
| 5,350,296 A | 9/1994 | Wikstrom ....................... | 432/80 |
| 5,380,505 A | 1/1995 | College .......................... | 423/175 |
| 5,393,225 A * | 2/1995 | Freiberger et al. ............ | 432/103 |
| 5,580,242 A * | 12/1996 | Becker ........................... | 432/103 |
| 6,419,481 B2 | 7/2002 | Ahvenainen ................... | 432/116 |
| 6,749,425 B1 * | 6/2004 | Nakayama ..................... | 432/118 |

* cited by examiner

*Primary Examiner* — Gregory A Wilson

(74) *Attorney, Agent, or Firm* — Kratz, Quintos & Hanson, LLP

(57) ABSTRACT

An apparatus and method for recovering heat radiating from the outer surface of a rotary kiln includes an enclosure formed as a stationary housing that has an axially extending opening and closure flaps on circumferential ends of the housing extending towards the shell to form a chamber and an exhaust fan, arranged to draw a flow of air into the housing, which flow of air recovers heat from the kiln shell and is discharged from the chamber for heat recovery therefrom.

18 Claims, 5 Drawing Sheets

APPARATUS AND METHOD FOR HEAT RECOVERY FROM ROTARY KILNS

FIELD OF THE INVENTION

The present invention relates to an apparatus and method for recovering heat radiating from the outer surface of a rotary kiln, such as those used to produce lime or cement.

BACKGROUND OF THE INVENTION

In the production of lime from limestone or cement from starting ingredients, long cylindrical-shaped rotary kilns are often used. In the production of lime from limestone, for example, a charge of limestone is charged to one end of the kiln and passed therethrough, while a fuel is also charged along with air to support combustion, and the limestone calcined to form lime which is then discharged from the discharge end of the kiln. The fuel and combustion air are usually fed to the interior of the kiln adjacent the discharge end for the calcined product. Such fuels are generally gas or coal. The kiln is a long cylindrical vessel having an outer metallic shell with an interior surface of the shell lined with refractory material so as to withstand the high temperatures present within the interior of the kiln. As the material within the kiln is calcined, the high temperatures therein heat the steel shell through the refractory lining and heat is transferred through and radiates from the shell, which is lost, and is both environmentally and economically disadvantageous.

Heat losses through the shell of a rotary kiln represent a significant amount of energy and significantly increases the amount of energy input required for the production of calcined material in a rotary kiln.

Efforts have been made to prevent the loss of heat from such kilns and have generally focused on reducing the rate of heat transfer through the shell, primarily through the use of different refractory materials and shape of such materials inside the shell of the kiln. There are, however, limits to the effectiveness of internal refractory insulation, primarily related to temperature limitations of refractory materials and physical strengths of such refractory materials.

It is an object of the present invention to provide an apparatus and method for recovering heat lost from the shell of a rotary kiln used for calcining materials.

SUMMARY OF THE INVENTION

An apparatus and method are provided for recovery of and reusing heat that emanates from a shell of a cylindrical-shaped rotary kiln used for calcining of charged material, the kiln having an axial length and an outer metallic surface.

The apparatus includes at least one enclosure of a stationary cylindrical housing spaced from and extending along at least a portion of the axial length of the rotary kiln, which has an opening extending axially therealong so as to expose a portion of the shell, and opposed spaced circumferential ends on the housing. Flexible closure flaps are provided along the axially extending opening on the circumferential ends of the housing and extend towards the shell, which close at least a portion of the space extending between the circumferential ends of the housing and the shell so as to retain heat discharged from the shell in a chamber formed between the shell and the housing. An exhaust fan is provided for drawing a flow of air into the chamber, which flow of air recovers heat from the shell and is heated in the chamber, and which discharges the resultant heated air from the chamber, and means are provided to recover the heat from the heated air discharged from the chamber.

The enclosure may be in the form of a single enclosure which preferably extends along a major portion of the axial length of the steel shell, or a plurality of spaced enclosures. A single fan may be used in conjunction with an enclosure or a plurality of fans may be used with an enclosure.

The flow of air is preferably drawn into the enclosure axially from axial ends of the housing, or seals may be provided at the axial ends of the housing and air drawn in past flexible closure flaps on the circumferential ends of the housing which are reduced in size to not completely seal against the steel shell.

The present method for recovering heat from a shell of a cylindrical-shaped rotary kiln having an axial length and an outer surface includes providing at least one enclosure in the form of a stationary cylindrical housing spaced from and extending along at least a portion of the axial length of the rotary kiln, the housing having an opening extending axially therealong so as to expose a portion of the shell, and opposed spaced circumferential ends on the housing having flexible closure flaps provided along the axially extending opening on the circumferential ends of the housing extending towards the shell, which closes at least a portion of the space extending between the circumferential ends of the housing and the shell so as to retain heat discharged from the shell in a chamber formed between the shell and the housing. A flow of air is drawn into the housing and through the chamber, which flow of air recovers heat from the shell in the chamber. Resultant heated air is discharged from the chamber, and the heat is recovered from the heated air discharged from the chamber.

Preferably, the flow of air is through a single enclosure which extends along a major portion of the axial length of the shell and heat is recovered from a major portion of the shell, although a plurality of such enclosures may be provided. Also, the air may, if desired, be drawn axially from axial ends of the housing, or past shortened flexible closure flaps, through the chamber.

BRIEF DESCRIPTION OF THE DRAWINGS

The present invention will be better understood by reference to the following description of a preferred embodiment of an apparatus of the present invention with reference to the accompanying drawings, wherein.

DETAILED DESCRIPTION

Figure 1:
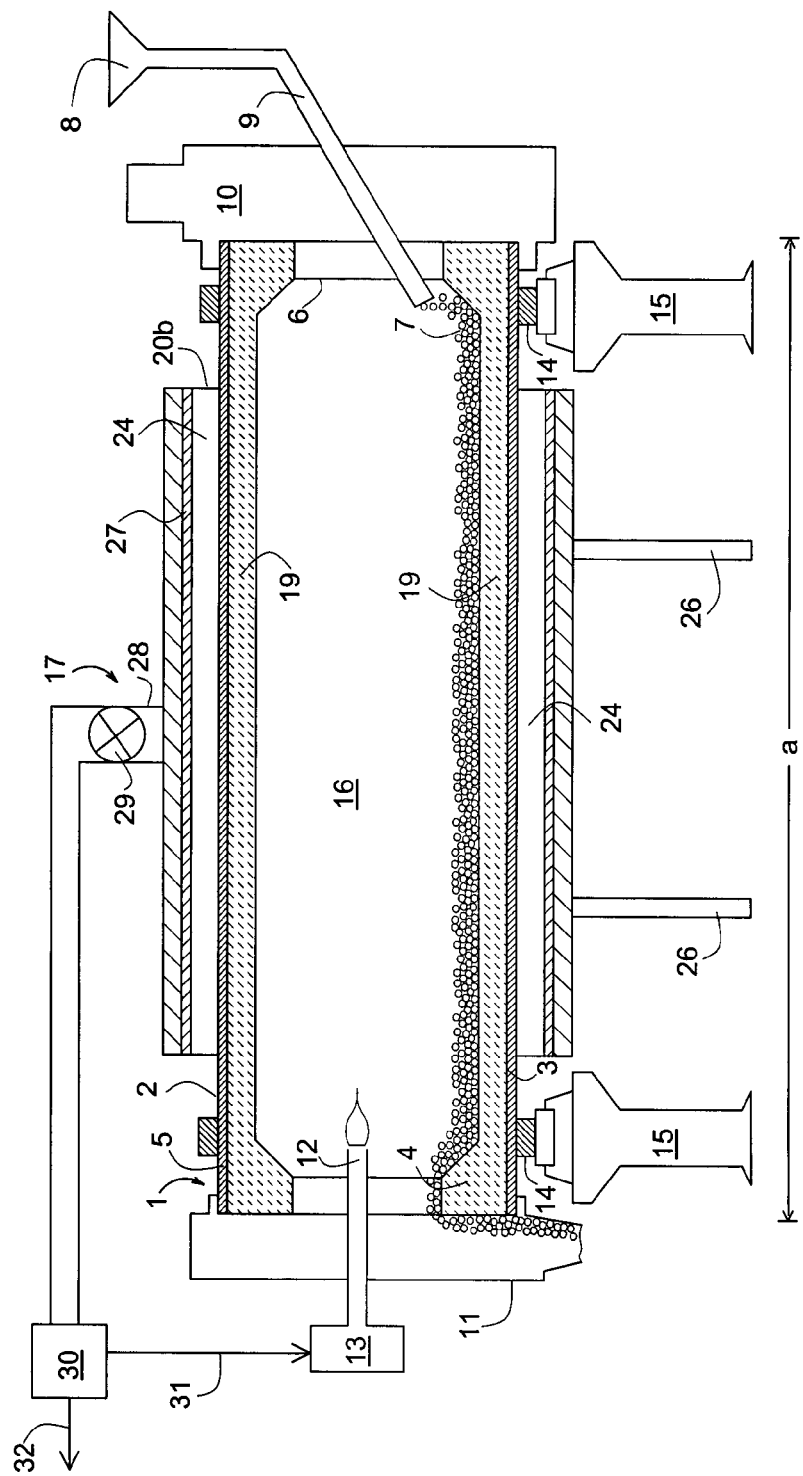
FIG. 1 is an elevational cross-sectional view of a rotary kiln having the apparatus of the present invention.

In accordance with the present invention, an apparatus and method are provided for recovery of heat radiating from the outer surface of a rotary kiln. Referring to the drawings, a cylindrical-shaped rotary kiln 1, includes a metal shell 2 having an inner surface 3 with a refractory lining 4 and an outer surface 5. The rotary kiln 1 has a charging end 6 to which a material 7 to be calcined is charged from a source 8 through line 9, and an enclosure 10 through which off gases are discharged from the rotary kiln 1. At the opposite end of the rotary kiln 1 there is a discharge housing 11 and a burner 12 that is fed with fuel and combustion air from a source 13. A means to rotate the kiln 1 is provided, such as rotatable rollers 14 on standards 15. In producing lime, limestone, as a material 7 to be calcined is fed from source 8 through line 9 to the interior 16 of the kiln 1 and is conducted through the kiln 1 where it is calcined to lime, and the lime is discharged through housing 11, after heating to a high temperature in the interior 16, by a combustion flame in the range of 2600 degrees F. or more. The lime kiln 1, as described, is conventional and does not, in itself, form part of the present invention.

Due to the high temperature in the rotary kiln, even with the use of a refractory lining 4, the outer surface 5 of the steel shell 2 becomes hot and radiates heat to the surrounding area. Recovery and reuse of the radiated heat from the steel shell would be both economically and environmentally advantageous.

In accordance with the present invention, an apparatus 17 is provided for recovery of heat from the steel shell 2 of the kiln 1, which kiln has an axial length a and outer surface 5. An enclosure 18 is provided that has a stationary housing 19 that is spaced from and extends along at least a portion of the axial length a of the kiln, which housing 19 has axial ends 20a and 20b, and an axially extending opening 21 that exposes a portion of the outer surface 5 of the steel shell 2, opposed circumferential ends 22a and 22b, and an inner annular wall 23. In order to at least partially seal a heat recovery chamber 24 between the steel shell 2 and an inner annular wall 23, flexible closure flaps 25 (FIG. 3) are secured to the circumferential ends 22a and 22b of the housing, which flaps extend towards the outer shell 2 and at least partially seal the chamber 24. In a preferred embodiment, the flaps substantially completely seal the chamber 24, and preferably contact the outer shell 2. The housing is situated about the steel shell 2 and is supported by post supports 26. The inner and outer annular walls 23 preferably have corrugations 27 to assist in heat transfer therefrom.

Figure 2:
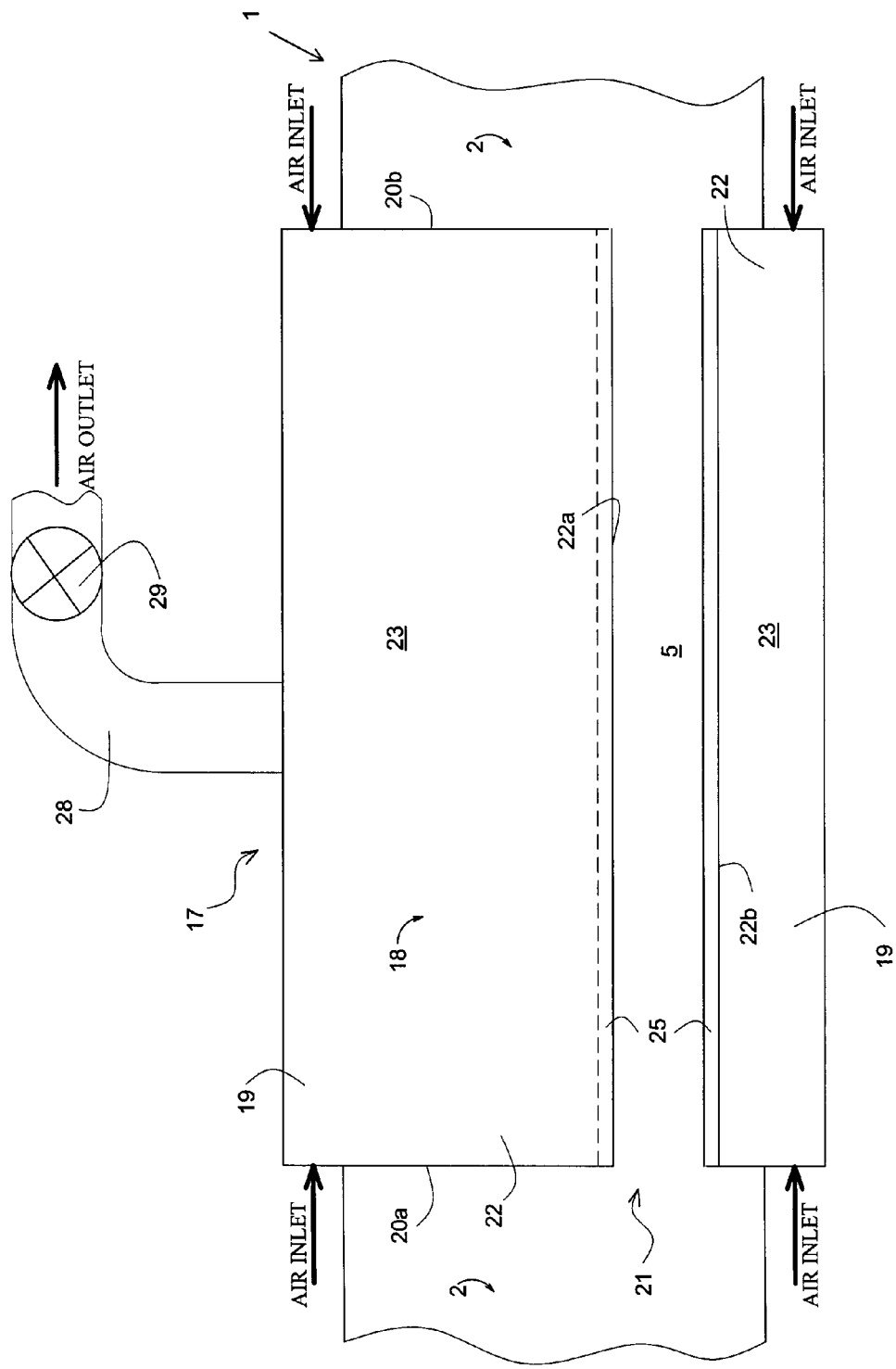
FIG. 2 is an enlarged elevational view of the apparatus of the present invention associated with a kiln.

An exhaust conduit 28 is connected with the chamber 24 through the annular wall 23, which exhaust conduit has a fan 29. The fan 29, as best shown in FIG. 2, draws air through the axial ends 20a and 20b and discharges the air through the exhaust conduit 28. As the air flows through the heat recovery chamber 24 the air is heated and the resultant heated air from the chamber is passed to a heat recovery device 30. The heat recovery device 30 may charge the heated air to combustion air in source 13 through line 31, or the heated air may be passed through line 32 to any other heat recovery system, such as a steam generators or other usage.

Figure 3:
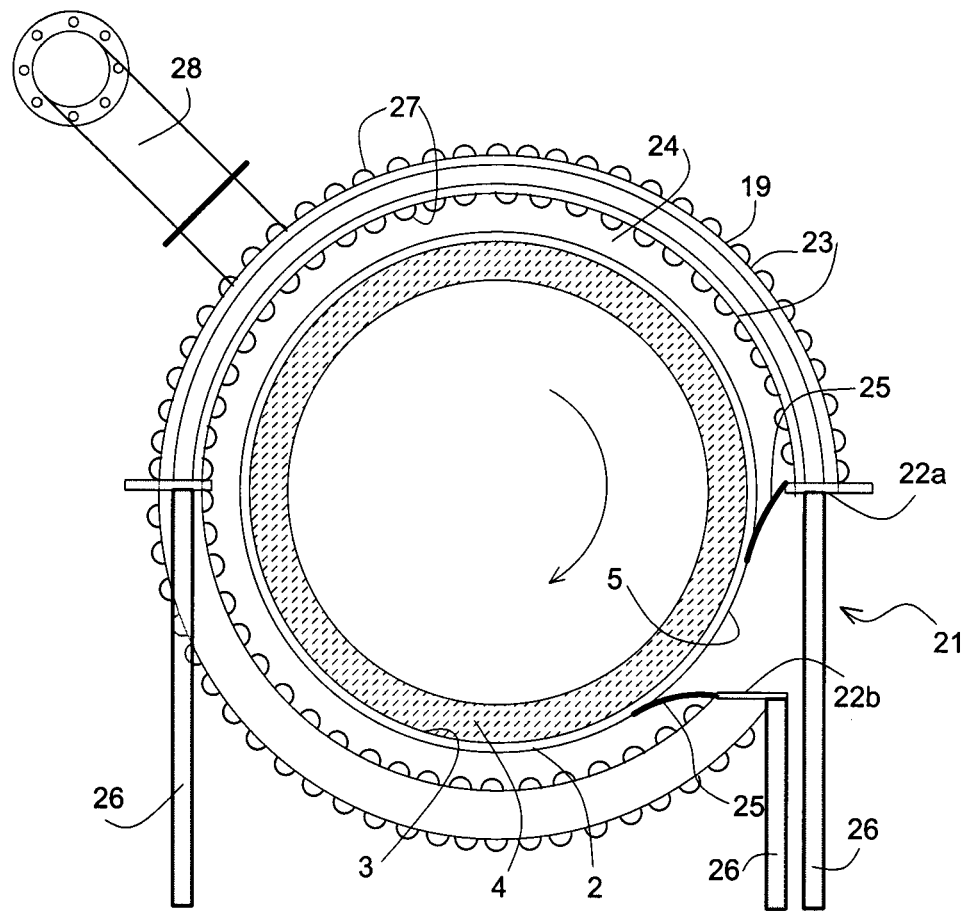
FIG. 3 is a cross-sectional view showing the support of the apparatus.

The housing of FIGS. 1-3 extends preferably along a major portion of the axial length a of the steel shell 2 and most preferably along about eighty (80) percent of the axial length a. The axially extending opening 21 is about 5-15 percent, preferably about 10 percent of the circumference of the housing 19, in width, and allows visual inspection of the steel shell 2 and measurement of the shell temperature so as to estimate the condition of refractory lining 4 and/or spot failure in the refractory lining.

Figure 4:
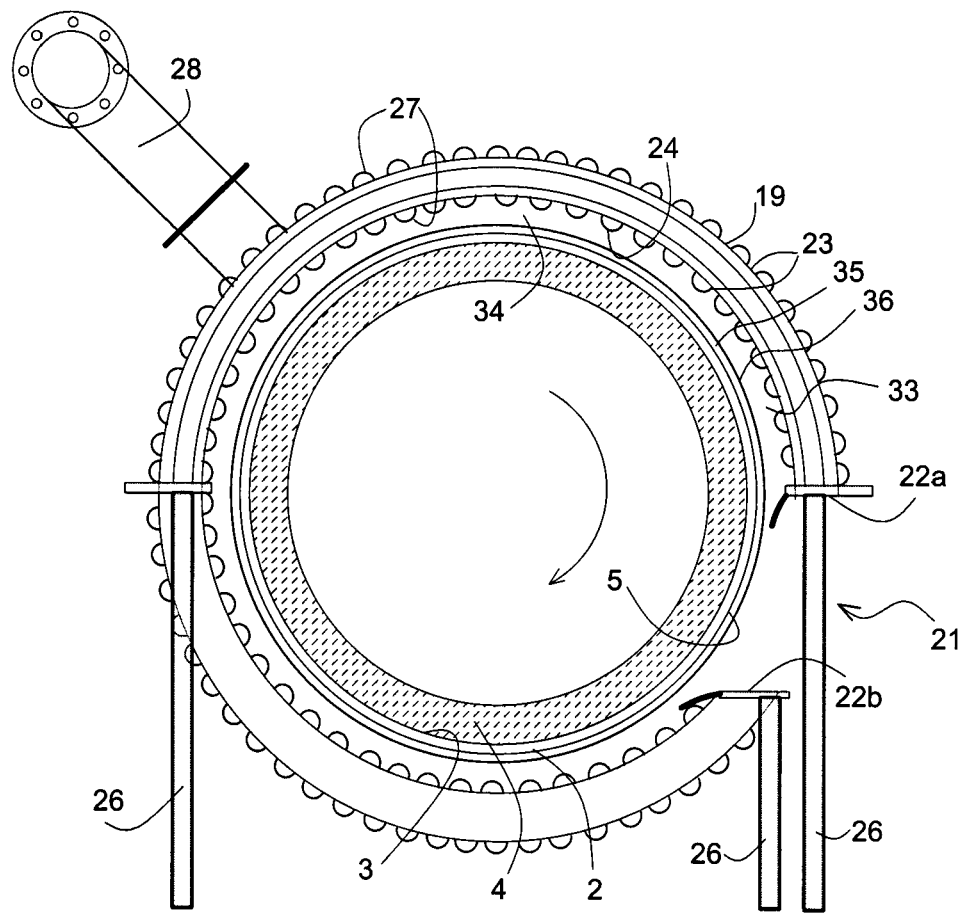
FIG. 4 is a cross-sectional view, similar to FIG. 3, showing another embodiment of the apparatus of the present invention.

In the embodiment illustrated in FIG. 4, the axial ends of the housing 19 have inwardly extending sealing members 33, such as flaps or flanges, that substantially close off the space 34 between the shell 2 and the ends of the housing 19 but leave small end opening 35 between the shell 2 and the inner end 36 of the sealing member 33. In such an embodiment, air is drawn into the chamber 24 through the axially extending opening 21 in the housing 19. The size of the small end opening 35 will determine how much air is drawn through axially extending opening 21 relative to air drawn in through end opening 35.

Figure 5:
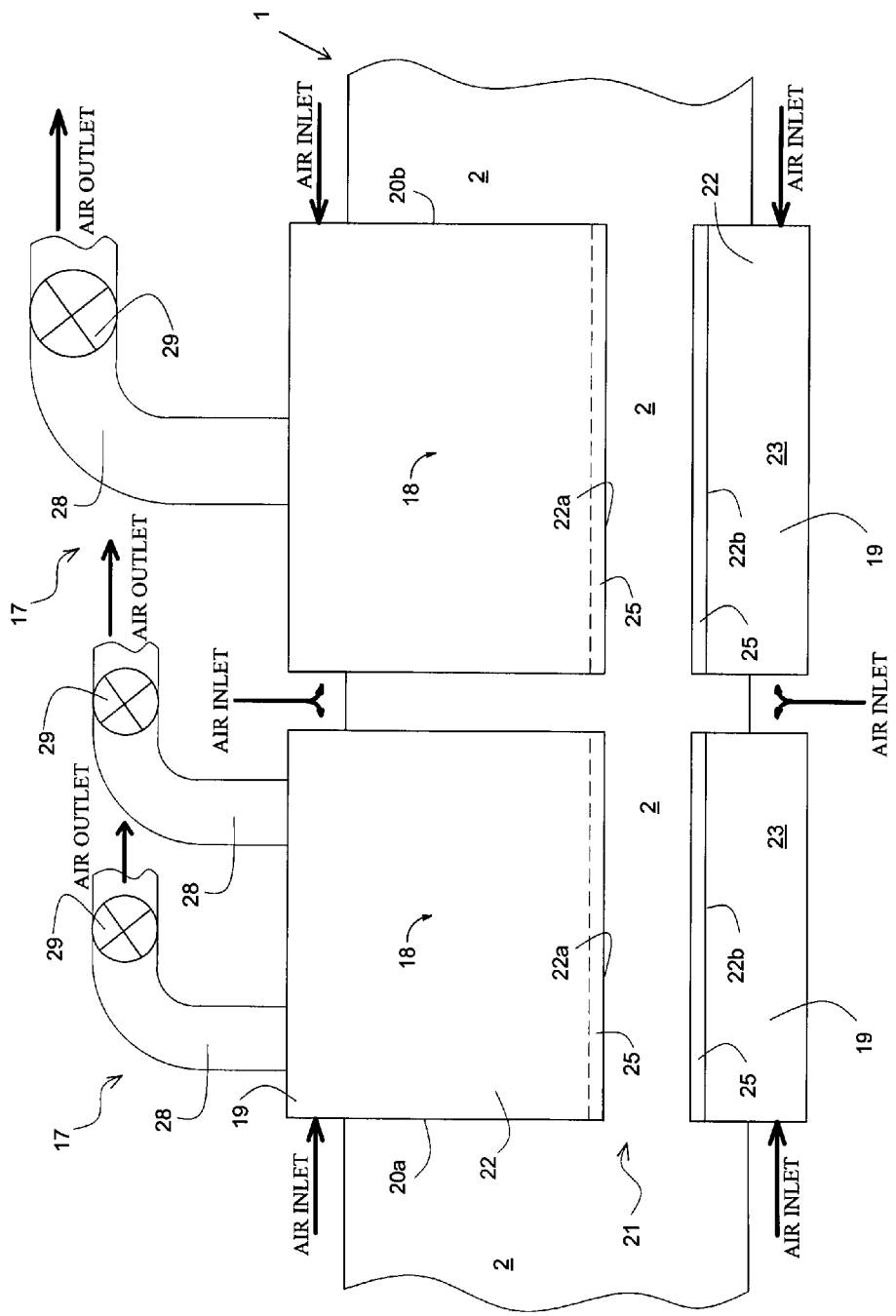
FIG. 5 is an enlarged elevational view similar to FIG. 2, showing a further embodiment of the present invention.

A further embodiment of the present apparatus is illustrated in FIG. 5, which shows the use of a plurality of spaced enclosures 18 disposed along the axial length of a kiln and also the use of a plurality of exhaust conduits 28 and exhaust fans with an enclosure 18.

According to the present method, an enclosure is provided for a cylindrical-shaped rotary kiln, the enclosure being formed as at least one stationary housing that is spaced from and extends along at least a portion of the axial length of the rotary kiln. The housing has an opening that extends axially therealong and exposes a portion of the shell of the rotary kiln. Opposed circumferential ends of the housing are provided with flexible closure flaps which extend towards the shell of the rotary kiln, and at least partially close the space between the circumferential ends of the housing and the kiln shell to form a chamber where heat discharged from the shell is retained. In order to recover the heat, a flow of air is drawn into the housing, such as by a fan disposed in an exhaust conduit connected to the chamber through an annular wall of the housing, with the flow of air being heated in the chamber to recover heat from the shell and the resultant heated air is discharged from the chamber through the conduit and the heat from the discharged air is recovered after being discharged from the chamber.

The heat from the discharged air can be recovered in a number of ways, such as feeding the discharged air to a combustion system for use in the rotary kiln, feeding the air to a heat exchanger to heat other fluids, or other heat recovery systems.

The flow of air may be drawn through a single enclosure, which preferably extends along a major portion of the axial length of the rotary kiln, or through a plurality of spaced such enclosures. Also, the flow of air may be drawn into the enclosure axially from the ends of the housing and through the chambers, or past shortened flexible closure flaps, or both.

The apparatus and method disclosed herein is especially suitable for use with rotary kilns for use in producing lime from limestone but may be used with other rotary kilns heated to high temperatures, where heat is radiated from the outer surface of the kiln.

What is claimed is:

1. An apparatus for recovery of heat from a shell of a circular-shaped rotary kiln having an axial length and an outer surface, comprising:

at least one enclosure in the form of a stationary housing spaced from and extending along at least a portion of the axial length of rotary kiln, the housing having an opening extending axially therealong so as to expose a portion of the shell, and opposed spaced circumferential ends on the housing;

flexible closure flaps provided along the axially extending opening and attached to the circumferential ends of the housing extending towards the shell, which at least partially close the space extending between the circumferential ends of the housing and the shell so as to retain heat discharged from the shell in a chamber formed between the shell and the housing;

an exhaust fan for drawing a flow of air into the housing, which flow of air recovers heat from the shell in the chamber, and discharges resultant heated air from the chamber; and means to recover heat from the heated air discharged from the chamber.

2. The apparatus as defined in claim 1 including an air preheater to preheat air fed to the rotary kiln for combustion and wherein the means to recover heat from heated air discharged from the chamber is a means for feeding the heated air to said preheater for combustion.

3. The apparatus as defined in claim 1 wherein said shell is a steel shell and said enclosure is a single enclosure and extends along a major portion of the axial length of the steel shell.

4. The apparatus as defined in claim 3 wherein said single enclosure extends along a length of about eighty percent of the axial length of the steel shell.

5. The apparatus as defined in claim 1 wherein a plurality of exhaust fans are provided for drawing air into the housing.

6. The apparatus as defined in claim 1 wherein the air is drawn by the at least one fan axially from axial ends of the housing.

7. The apparatus as defined in claim 1 wherein the flexible closure flaps are end seals provided at the axial ends of the housing and air is drawn into the housing by the at least one fan past the flexible closure flaps.

8. The apparatus as defined in claim 1 wherein the closure flaps contact the outer surface of the rotary kiln and substantially completely close the space extending between the circumferential ends of the housing and the shell.

9. The apparatus as defined in claim 1 wherein the circular-shaped rotary kiln is a kiln for producing lime from limestone.

10. An apparatus for recovery of heat from a shell of a circular-shaped rotary kiln having an axial length and an outer surface, comprising:
  at least one enclosure in the form of a stationary housing spaced from and extending along at least a portion of the axial length of rotary kiln, the housing having an opening extending axially therealong so as to expose a portion of the shell, and opposed spaced circumferential ends on the housing;
  flexible closure flaps provided along the axially extending opening are attached to the circumferential ends of the housing extending towards the shell, which at least partially close the space extending between the circumferential ends of the housing and the shell so as to retain heat discharged from the shell in a chamber formed between the shell and the housing;
  an exhaust fan for drawing a flow of air into the housing, which flow of air recovers heat from the shell in the chamber, and discharges resultant heated air from the chamber; and
  means to recover heat from the heated air discharged from the chamber, wherein the stationary housing has an annular wall and corrugations are formed on the annular wall.

11. An apparatus for recovery of heat from a shell of a circular-shaped rotary kiln having an axial length and an outer surface, comprising:
  at least one enclosure in the form of a stationary housing spaced from and extending along at least a portion of the axial length of rotary kiln, the housing having an opening extending axially therealong so as to expose a portion of the shell, and opposed spaced circumferential ends on the housing;
  flexible closure flaps provided along the axially extending opening are attached to the circumferential ends of the housing extending towards the shell, which at least partially close the space extending between the circumferential ends of the housing and the shell so as to retain heat discharged from the shell in a chamber formed between the shell and the housing;
  an exhaust fan for drawing a flow of air into the housing, which flow of air recovers heat from the shell in the chamber, and discharges resultant heated air from the chamber; and
  means to recover heat from the heated air discharged from the chamber, wherein the opening extending between the opposed circumferentially spaced ends of the housing is about ten percent of the circumference of the housing in width.

12. An apparatus for recovery of heat from a shell of a circular-shaped rotary kiln having an axial length and an outer surface, comprising:
  at least one enclosure in the form of a stationary housing spaced from and extending along at least a portion of the axial length of rotary kiln, the housing having an opening extending axially therealong so as to expose a portion of the shell, and opposed spaced circumferential ends on the housing;
  flexible closure flaps provided along the axially extending opening are attached to the circumferential ends of the housing extending towards the shell, which at least partially close the space extending between the circumferential ends of the housing and the shell so as to retain heat discharged from the shell in a chamber formed between the shell and the housing;
  an exhaust fan for drawing a flow of air into the housing, which flow of air recovers heat from the shell in the chamber, and discharges resultant heated air from the chamber; and
  means to recover heat from the heated air discharged from the chamber, wherein a plurality of said enclosures are provided along the axial length of the rotary kiln.

13. A method for recovering heat from a shell of a circular-shaped rotary kiln having an axial length and an outer surface comprising:
  providing at least one enclosure in the form of a stationary housing spaced from and extending along at least a portion of the axial length of rotary kiln, the housing having an opening extending axially therealong so as to expose a portion of the shell, and opposed spaced circumferential ends and attached to the housing having flexible closure flaps provided along the axially extending opening on the circumferential ends of the housing extending towards the shell, which at least partially close the space extending between the circumferential ends of the housing and the shell so as to retain heat discharged from the shell in a chamber formed between the shell and the housing;
  drawing a flow of air into the housing and through the chamber, which flow of air recovers heat from the shell in the chamber; discharging resultant heated air from the chamber, and recovering heat from the heated air discharged from the chamber.

14. The method as defined in claim 13 wherein the rotary kiln is for producing lime from limestone, with preheated air fed to the kiln for combustion, and the resultant heated air discharged from the chamber is used to heat said preheated air fed to the kiln.

15. The method as defined in claim 13 wherein a single enclosure is provided and the enclosure extends along a major portion of the axial length of the shell and heat is recovered from a major portion of the shell.

16. The method as defined in claim 13 wherein the flow of air is drawn axially from axial ends of the housing and through the chamber.

17. The method as defined in claim 13 wherein the flow of air is drawn past the flexible closure flaps.

18. A method for recovering heat from a shell of a circular-shaped rotary kiln having an axial length and an outer surface comprising:

providing at least one enclosure in the form of a stationary housing spaced from and extending along at least a portion of the axial length of rotary kiln, the housing having an opening extending axially therealong so as to expose a portion of the shell, and opposed spaced circumferential ends are attached to the housing having flexible closure flaps provided along the axially extending opening on the circumferential ends of the housing extending towards the shell, which at least partially close the space extending between the circumferential ends of the housing and the shell so as to retain heat discharged from the shell in a chamber formed between the shell and the housing;

drawing a flow of air into the housing and through the chamber, which flow of air recovers heat from the shell in the chamber; discharging resultant heated air from the chamber, and recovering heat from the heated air discharged from the chamber, wherein a plurality of enclosures are provided along the axial length of the rotary kiln and a flow of air drawn into each of the housings.

* * * * *